May 9, 1967

K. G. MEISTER ET AL 3,319,038

ARTICLE TRANSFER APPARATUS

Filed June 15, 1964

INVENTORS
K.G. MEISTER
F. WAHL
BY A. J. Nugent
ATTORNEY

May 9, 1967 K. G. MEISTER ET AL 3,319,038
ARTICLE TRANSFER APPARATUS
Filed June 15, 1964 4 Sheets-Sheet 4

United States Patent Office 3,319,038
Patented May 9, 1967

3,319,038
ARTICLE TRANSFER APPARATUS
Karl G. Meister, Newark, and Frank Wahl, North Bergen, N.J., assignors to Western Electric Company Incorporated, New York, N.Y., a corporation of New York
Filed June 15, 1964, Ser. No. 375,076
10 Claims. (Cl. 219—79)

This invention relates to article transfer apparatus and particularly to an indexing conveyor-type apparatus for moving a plurality of small parts, such as relay springs, through one or more work stations.

One step in the manufacture of miniature relays of the type shown in W. R. Scherb, Jr., Ser. No. 276,334, filed Apr. 29, 1963, involves welding one or more contacts on each spring of a relay spring card which comprises a number of individual springs joined together by connecting webs at each end. The welded contacts must be precisely positioned on the springs in order to assure reliable and accurate contact operation and to prevent excessive contact wear. The small size and rather delicate nature of the springs, however, hinder the application of automatic manufacturing procedures to the contact welding operation in view of the problem in feeding and positioning such parts in a high-speed process. Consequently, although automatic welding devices are commercially available, it has, heretofore, been extremely difficult to realize their full output capabilities in miniature relay manufacture because of the aforementioned material handling problem.

In order to facilitate the mass production of miniature relay assemblies, it is necessary to provide a means for rapidly feeding and positioning individual relay springs with relation to a pair of automatically operated welding electrodes. This invention, therefore, proposes a conveyor-type transfer apparatus which advances relay springs through a welding station for rapidly making contact welds thereon while the springs are in card form. This arrangement facilitates automatic high-speed welding operations by eliminating a former feed bottleneck and it also provides an accurate welding method for the bonding of contacts to thin metal springs.

Accordingly, an object of this invention is to automatically feed a plurality of relay springs one at a time in card form to a welding position.

Another object of this invention is to automatically weld a predetermined contact arrangement on a succession of miniature relay springs in a rapid and efficient manner.

Another object of this invention is to move a conveyor having nested spring groupings positioned thereon relative to a work position in predetermined variable increments of travel corresponding to the particular spring design and to move the conveyor in larger increments of travel upon completion of work on a spring grouping.

A further object of this invention is to automatically and rapidly feed a plurality of relay spring cards to a welding station by means of an indexing conveyor-type apparatus and to successively position the individual springs of a card in a proper position for contact welding.

A still further object of this invention is to feed a relay spring card having contacts welded thereon to a shaping station which operates in synchronization with a contact welding station to shape the contacts of a predetermined contact arrangement to precise dimensional requirements.

With these and other objects and advantages in view one embodiment of the present invention contemplates a transfer apparatus of the indexing conveyor type for feeding groups of miniature relay springs in card form to a plurality of work stations. The spring groupings are fed at a first station into a succession of chain-driven nests which advance the individual springs one at a time between a pair of contact welding electrodes and upon completion of the operation, transfer the first spring of a following spring group into the welding position. The welded springs are guided to a subsequent work station where the contacts are shaped in synchronization with the welding operation to remove burrs and to correct any dimensional inaccuracies.

The predetermined indexing cycle of the nests is controlled by an air-driven cam shaft operatively connected to the nest conveyor and having a cam follower arrangement mounted on one end and an indexing wheel with an interchangeable cover plate on the other end. The cam surface has a configuration corresponding to the contact spacings on a webbed group of relay springs so that when the shaft is operated the cam intermittently advances a nested spring group relative to the welding electrodes to position the individual springs with reference thereto. The indexing wheel is provided with a plurality of slots which are selectively engaged by a pivotal lever by positioning the cover plate to accept or reject said spring-loaded lever which actuates the welding electrodes. During the welding operation, the lever simultaneously operates a switch during alternate welds to initiate a bumping operation on a pair of springs in a nest previously advanced to the shaping station.

Other objects and advantages of the present invention will be more apparent when considered in conjunction with the accompanying drawings, wherein.

Figure 1:
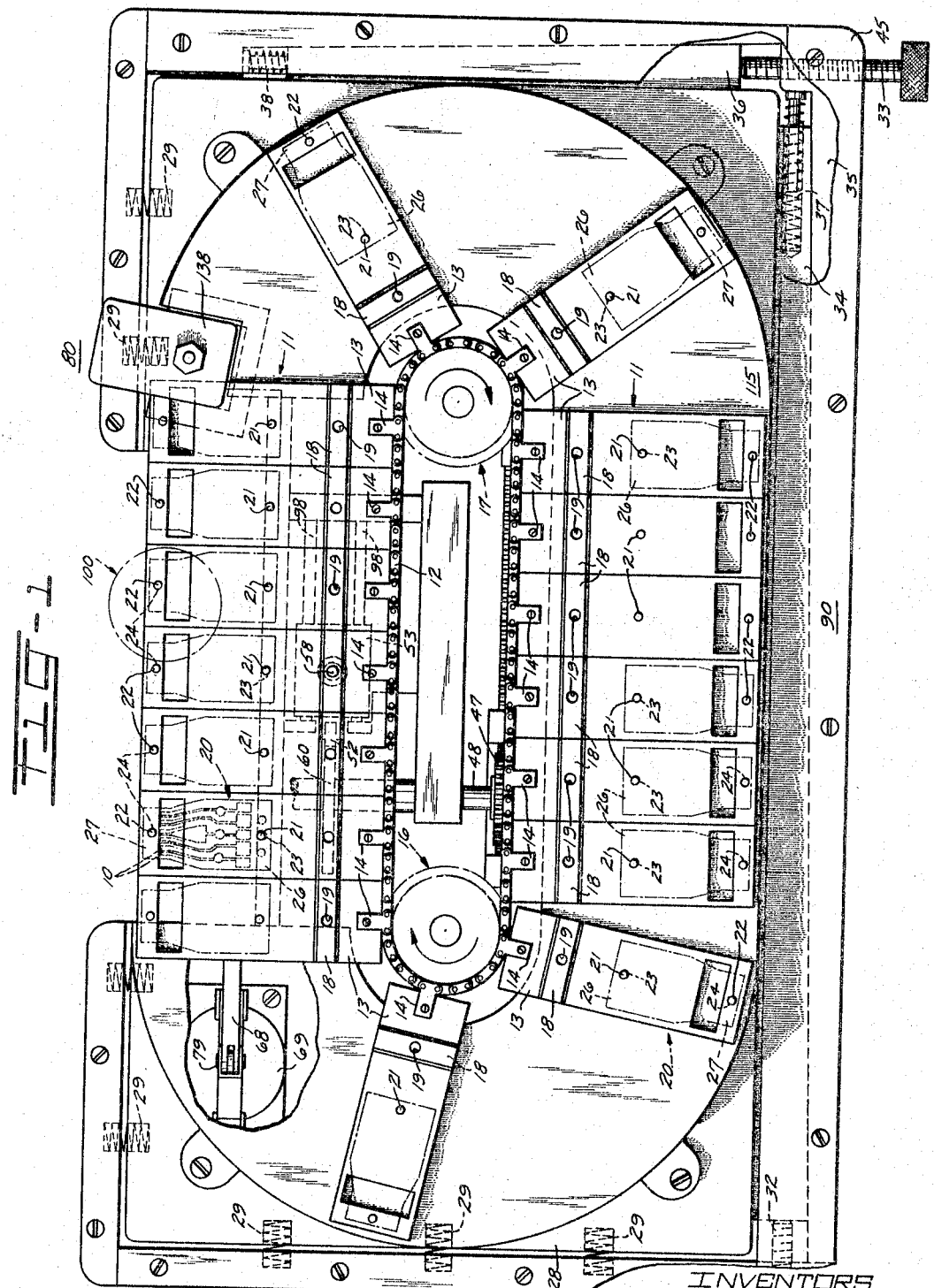
FIG. 1 is a top view of the apparatus for practicing the invention, portions of which are cut away to clarify the design.

Referring to FIG. 1 of the drawings, one illustrative embodiment of the invention for the contact welding of miniature relay springs 10 comprises a rotatable conveyor-type transfer apparatus, having a plurality of nests 11 for receiving groups of miniature relay springs in card form 20. The nests 11, which are of a general rectangular shape are mounted to a chain 12 at one end 13 by a suitable connection 14 and rotate in the indicated direction about sprockets 16 and 17. The nests 11 include a raised intermediate portion 18 having an aperture 19 extending therethrough and a pair of spaced-apart projecting elements 21 and 22 to engage apertures 23 and 24 in the connecting web portions 26 and 27 to the relay cards 20. Although a total of seventeen nests 11 are depicted in the illustrated embodiment, the invention would function equally well with any convenient number of nests.

Included among the features of the present system, is a means for adjusting the transfer apparatus to accurately locate the individual springs 10 with reference to the contact welding electrodes 30a and 30b. As seen from FIG. 1, the conveyor support 28 is spring-mounted in a horizontal plane by springs 29 extending between the frame 31 and said support 28. A micrometer adjustment in transversely opposed directions is provided by screws 32 and 33 which engage tapered slides 34 and 36 respectively, within a protective cover 45. For example, the tapered slide 34 may be forced against the spring 37 and along the stationary member 38 to move the entire frame 31 uniformly in a single direction.

Screw 33 operates in a similar manner to advance slide 36 against the backing of spring 38 in order to provide an adjustment in a second direction. In the selected embodiment, the slides are provided with a taper of approximately .336 inch per foot which furnishes the precise adjustment necessary for contact welding.

Figure 2:
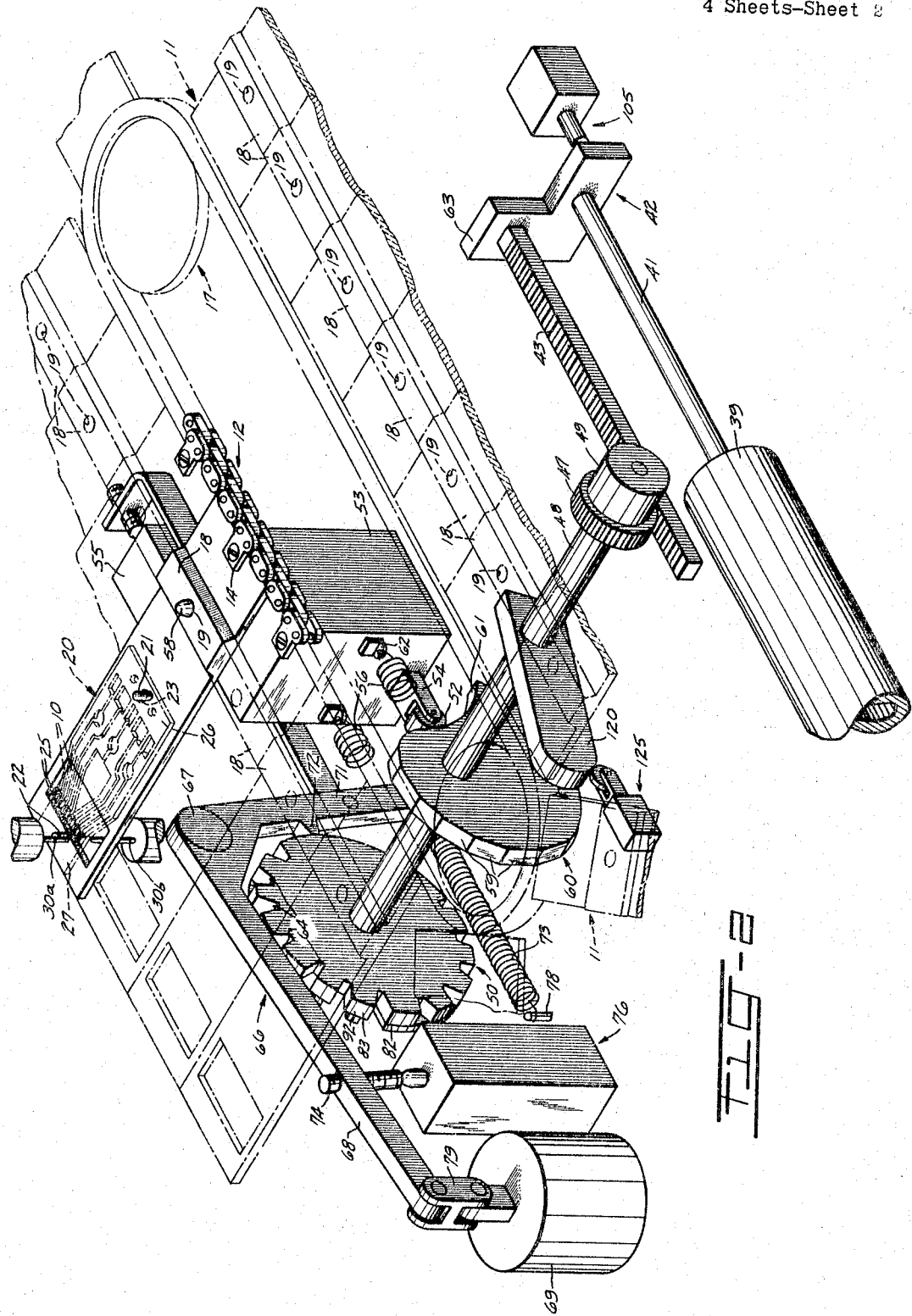
FIG. 2 is a schematic illustration of the subject conveyor-type apparatus primarily illustrating the actuating elements for the system.
Figure 3:
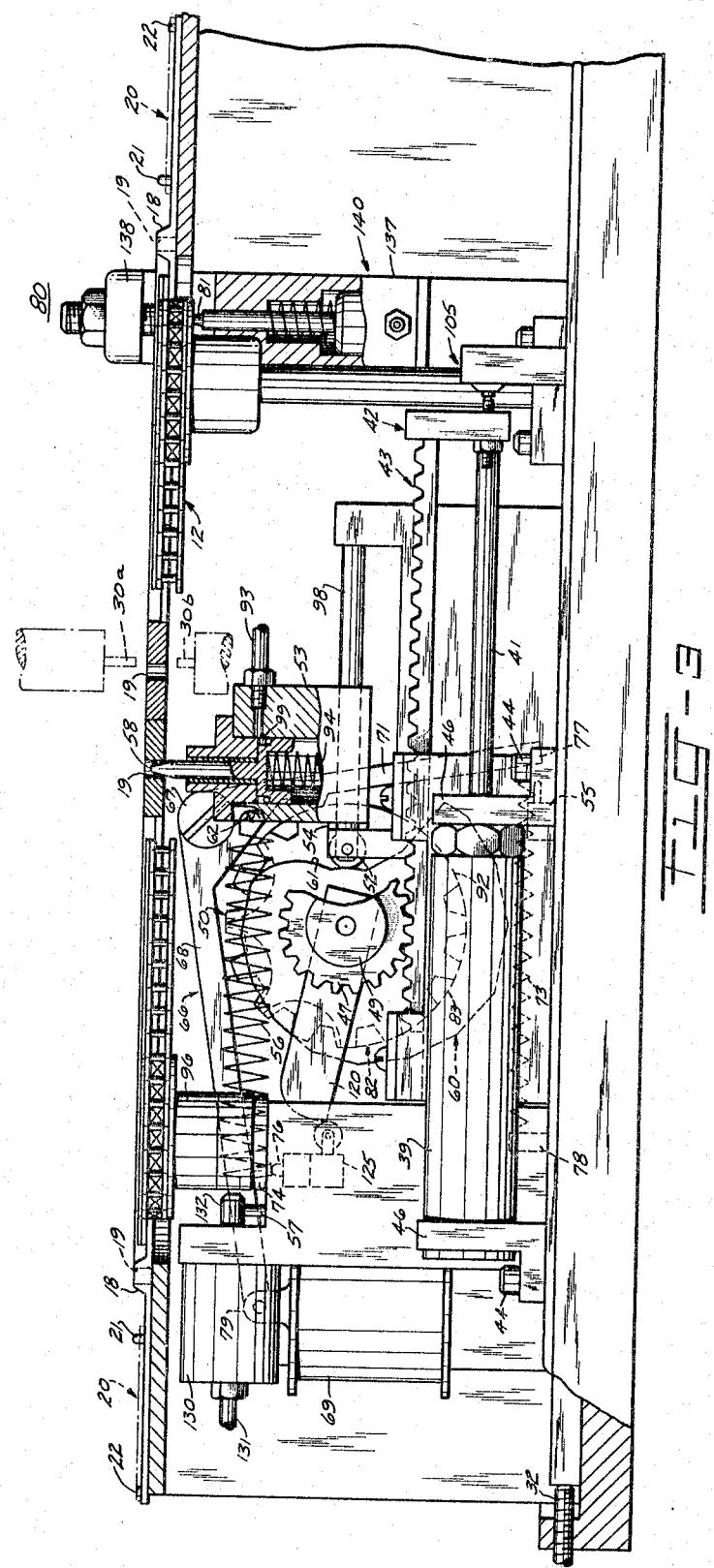
FIG. 3 illustrates a broken away side view of the invention.

As shown in FIGS. 2 and 3 the nests 11 are driven by a fluid drive means such as air cylinder 39 which includes a piston rod 41 having a substantially L-shaped member 42 mounted on one end thereof to impart motion to a toothed rack 43 one end of which is secured to the upper portion 63 of member 42. The air cylinder 39 is secured to the frame 28 by bolts 44 which extend through brackets 46 and operates in a horizontal plane to drive the rack 43 back and forth with movement of the piston rod 41. The movable rack 43 engages a gear 47 mounted to one end of the drive shaft 48 for the conveyor to transmit rotary movement thereto through a one-way clutch 49. A toothed indexing wheel 50 is mounted on the other end of the shaft 48 while a cam 60 and an eccentric 120 are mounted at intermediate portions thereof. The rotational movement of the shaft 48 drives the cam 60 in predetermined increments of travel against roller follower 52 which is connected to slidable element 53 by bracket 54. Element 53 is normally restrained by springs 56 extending between connections 62 and the frame portion 57 and includes a spring-loaded air-driven plunger or pilot pin 58 mounted therein to engage the apertures 19 in the nests 11. Thus, the rotational movement of the shaft 48 is transmitted to the nests when the plunger 58 engages one of the plurality of chain-linked nests 11 and transports it a fixed distance corresponding to the incremental advance surfaces 59 on the periphery of the cam surface.

Since the cam is provided with a plurality of incremental advance surfaces 59, it is possible to move the nests 11 in any convenient number of fixed steps corresponding to the distance between adjacent springs 10. The cam disclosed in the drawings includes twelve incremental advance surfaces 59 corresponding to six sets of spring contacts 25 and a sloping return surface 61 which permits return of the element 53 to its original position when the plunger 58 is withdrawn from a nest 11 upon completion of a work cycle. The cam 60 is designed to advance one or more individual springs 10 into a welding position in synchronization with the operation of contact welding electrodes 30a and 30b. In the illustrated embodiment the center line distance between adjacent twin spring contacts is approximately .05 inch while the distances between contacts on adjacent springs and on opposite sides of the center line of the card are slightly greater.

Figure 4:
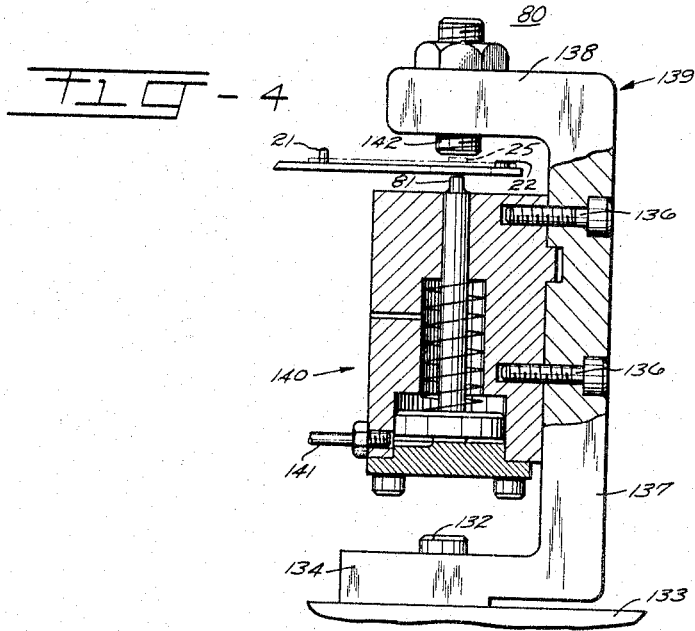
FIG. 4 shows a typical shaping station which forms welded spring contacts to the required size.

The indexing wheel 50 includes a plurality of slots 64 disposed about its periphery, every second slot being slightly deeper than the adjacent slots in order to permit actuation of switch 55. An angular member 66 is hinged about point 67 and comprises an upper portion 68 mounted to a solenoid 69 at one end by suitable means 79 and a downwardly extending portion 71 connected to the other end of the upper portion 68. A tooth or protrusion 72, designed to engage the slots 64 in the wheel 50, is located intermediate the ends of the lower portion 71 and biased against the wheel 50 by spring 73 which is mounted in tension between point 77 of member 66 and the projection rod 78. The upper portion 68 includes threaded adjusting means 74 for contacting an air valve 76 which operates cylinder 39 to initiate each welding cycle as will be described later in detail. The switch 55 is positioned adjacent the lower portion 71 of member 66 to be actuated when the tooth 72 engages the slots 64 having a greater depth. The switch 25 operates a shaping hammer 81 to size a pair of juxtaposed contacts 25 at a shaping station 80 as shown in FIG. 4.

A removable cover plate 82 may be mounted on the shaft 48 adjacent the toothed wheel 50 in order to accommodate different spring designs. The cover plate 82 has a configuration corresponding to the slots 64 of the wheel 50 when it is desired to perform a contact welding operation on the springs 10 but the shape of the plate is contiguous with the outer rim or periphery 83 of the wheel 50 when no welding is to be performed. In the latter instance the locking tooth 72 which is wider than the slots 64 rides on the rim 83 of the cover plates 82 until it encounters a succeeding slot 64 which is not blocked by the plate 82. The tooth 72 then slides into the wedge-shaped slot 64 precisely locating and locking the indexing wheel 50.

In operation, the nests 11 are loaded either manually or automatically with springs 10 in the area generally designated as 90 on FIG. 1 and indexed to successive welding and bumping positions 100 and 80 respectively. The nests 11 are loaded one at a time with relay spring cards 20 by positioning the apertures 23 and 24 over pins 21 and 22. The spring cards 20 are then transported to the welding station 100 by manual operation of switch 84 (see FIG. 6). Ordinarily, the contact welder, not shown, can be prepared for continuous operation by removing a clutch block from the drive of the contact welder. The welder is then actuated to weld contacts 25 on the leading spring 10 of a relay card 20 by bringing upper and lower electrodes 30a and 30b in contact with the spring 10. The upper electrode 30a is a conventional contact welding electrode which leaves a welded deposit of metal on the spring 10. Manifestly, it would be possible such as in the case of transfer springs to use two metal-depositing electrodes to weld contacts 25 on both sides of the springs 10.

Figure 5:
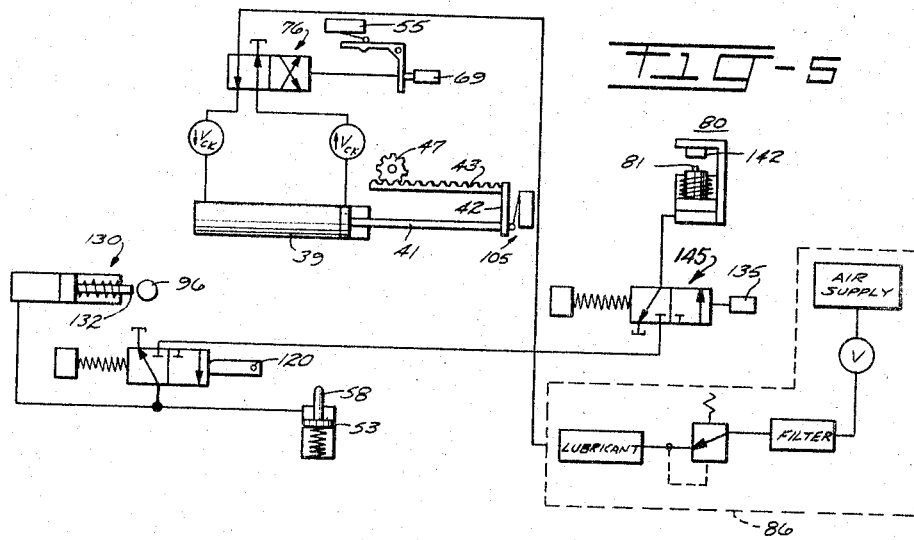
FIG. 5 shows the pneumatic control circuit for the apparatus.
Figure 6:
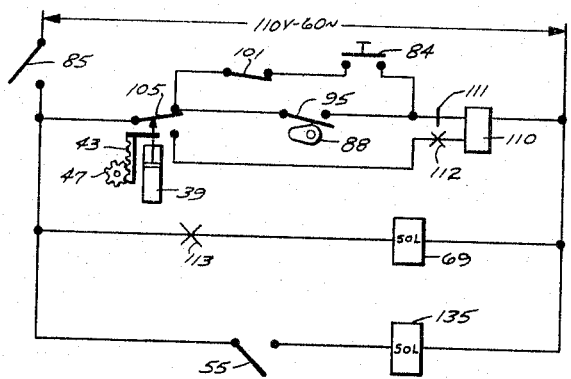
FIG. 6 illustrates the electrical circuit for the apparatus.

Referring to FIGS. 5 and 6, with current supplied through switch 85, manual switch 84 is operated as previously mentioned to feed a spring card 20 into a welding position and perform a first welding operation. Switch 101 may be closed by a cam on the drive shaft of the welder (not shown) in order that manual switch 84 will only operate the conveyor if the system is at rest. The details of the manual operation are similar to the automatic operation so a separate description will not be attempted. Immediately after completion of the first weld, the apparatus functions automatically in the following manner. Switch 95 is closed by cam 88 on the drive shaft of the contact welder (not shown) for a predetermined interval, energizing relay 110 through normally closed contacts 111. Relay 110 locks operated to ground closing contacts 113 which energize solenoid 69.

Solenoid 69, when operated, moves downwardly pivoting member 66 about point 67 and thereby disengaging the locknig tooth 72 from the indexing wheel 50 and freeing the shaft 48 for rotational movement (see FIG. 2). The upper portion 68 of member 66 includes an adjustment screw 74 which actuates valve 76 during its pivotal movement to supply air pressure from the conventional source to drive cylinder 39. The driving motion of cylinder 39 is transmitted to the shaft 48 through spur gear 47 which meshes with the piston-driven rack 43. The cam shaft 48 rotates shifting the pilot-pin 58 a predetermined distance corresponding to the incremental advance surfaces 59 through follower connection 52, 54. The pilot-pin 58 which engages an aperture 19 in a nest 11 moves a spring 10 into a contact welding position at station 100. Since the nests 11 are connected to the chain 12 the driven nest advances the chain-linked nests 11 about sprockets 16 and 17.

As the drive cylinder shaft or rod 48 starts moving, switch 105 becomes disengaged from member 42 and opens de-energizing relay 110. The control relay 110 drops out opening contacts 112 and 113, the latter contacts de-activating solenoid 69 which controls the pivotal movement and locking action of member 66. The tooth 72 on the spring-loaded angular member 66 rides on the rim 92 of indexing wheel 50 and the periphery 83 of cover plate 82 until it encounters the next uncovered slot 64 in the wheel 50. The tooth 72 slides into the slot 64 precisely locating and locking the indexing wheel 50.

The movement of member 66 operates valve 76 which may be a conventional 4-way air valve, to reverse the air flow in drive cylinder 39. Overrunning clutch 49 on the cam shaft 48 permits the piston rod 41 to return to its initial position. The cycle may now be repeated for each succeeding weld.

After the contacts 25 have been welded on a relay card 20, eccentric 120 contacts switch 125 to supply air to the retractable plunger 58 through inlet 93. The plunger 58 is driven downwardly from the nest 11 and within the slidable element 53 against the action of spring 94. At the same time cylinder 130 is actuated by air supplied through inlet 131 to force brake 132 against the sprocket housing 96 to prevent movement of the chain 12 when the plunger 58 is withdrawn from the nests. The return surface 61 of the cam 60 moves the slidable plunger element 53 along bars 98 and positions the plunger 58 beneath a succeeding nest 11. The air pressure is bled from the plunger cavity 99 permitting the spring-urged plunger 58 to move upwardly to engage a nest cavity 19. The relay card 20 is then advanced in the previously described manner by the cam surface which in one embodiment comprises 12 dwell surfaces 59 equally spaced over an arc 247.5° and a return surface 61.

With reference to FIG. 4, the cylinder 140 is controlled by a skinner valve 145 having a solenoid 135 which is operated by switch 55. The valve 145 supplies air through inlet 141 to drive the spring-loaded hammer 81 in a vertical direction forcing a pair of contacts 25 against the anvil 142. Switch 55 is operated when tooth 72 engages every second slot 64 on the indexing wheel 50, said alternate slots being approximately .005 inch deeper than adjacent slots to permit the lower portion 71 of member 68 to contact the switch 55.

The shaping station includes a substantially channel-shaped bracket 139 with an anvil 142 having a threaded body portion 143 for adjustment purposes and a bumping cylinder 140 mounted to a vertical portion 137 by suitable connecting means 136. The base of bracket 139 is mounted to the supporting member 133 by a bolt connection 132.

The contact welded spring cards 20 may be unloaded either manually or automatically in the area 115. Additional cards 20 are then fed into the nests 11 by hand or magazine-fed in the area designated as 90. The apparatus may be run continuously to position individual contact springs 10 for welding and shaping operations and to feed additional cards 20 into position upon completion of the operation on a prior card 20.

It is to be understood that the above-described arrangements are simple illustrative examples of the application of the principles of the invention. Numerous other arrangements may be readily devised by those skilled in the art which will embody the principles of the invention and fall within the spirit and scope thereof.

What is claimed is:
1. In a system for advancing a series of work holders to and then through a plurality of work stations,
a conveyor for supporting said work holders,
drive means for advancing said conveyor a first predetermined distance to successively move said work holders to said work stations, and
means rendered effective upon each advance of said conveyor by said drive means for incrementally advancing the conveyor in a series of steps which are less than said first predetermined distance to move said work holders through said work stations.

2. In a system as set forth in claim 1 for advancing a series of work holders to and through a plurality of work stations, and the system further comprises: means for selectively varying the successive increments of advance of said conveyor.

3. In a system as set forth in claim 2 wherein said means for selectively varying the successive increments of travel of said conveyor comprises:
an index wheel mounted to the drive means having a plurality of notches;
a toothed member mounted against the wheel for engaging successive notches to halt the conveyor movement;
means for intermittently disengaging the toothed member from the wheel to permit movement thereof; and
a cover plate mounted adjacent the index wheel selectively positioned to preclude engagement of the toothed member with selected notches.

4. A transfer apparatus for moving a succession of contact springs in card form wherein a group of individual springs are joined together at their ends with reference to a work station comprising:
a conveyor;
a plurality of nests mounted thereon for receiving relay spring cards;
means for moving the conveyor to advance a group of springs into the station;
means for moving the conveyor to advance the group of springs through the work station comprising:
an air cylinder adapted to be operated in a predetermined sequence;
means for intermittently actuating the cylinder;
a drive shaft operatively connected to the air cylinder;
a cam mounted on said shaft having a plurality of incremental advance surfaces and a return surface;
a slidable housing having a retractable connecting member for engaging the conveyor; and
a cam follower having a roller portion engaging the cam surface and an elongated portion mounted to the housing for moving said housing in predetermined increments of travel corresponding to the cam surfaces, the conveyor being driven thereby to position the springs in a selected manner.

5. A transfer apparatus for moving a succession of relay spring groupings to and then through a work station comprising:
a conveyor;
a plurality of rotatable nests mounted on said conveyor for receiving spring groupings;
a rack;
drive means for reciprocating said rack;
a drive shaft having a gear mounted thereon to mesh with the rack;
a clutch for transmitting the rack motion to the shaft in a fixed direction;
a cam mounted to the shaft and having a predetermined number of incremental advance surfaces;
a slidable means including a retractable member for engaging the conveyor and a cam follower engaging the cam to be driven thereby in increments corresponding to the cam incremental advance surfaces;
means for actuating the drive means at intermittent intervals to drive the rack, gear, clutch and cam to incrementally advance the slidable means;
means for bringing the retractable member in contact with one of the nests for imparting the driving movement of the slidable means to drive the conveyor forward and then withdrawing the retractable member upon completion of the driving movement; and
means operable at the work station in synchronization with the incremental conveyor movement for working on said spring grouping.

6. An apparatus in accordance with claim 5 further including:

means for holding the conveyor in a fixed position when the means for bringing the retractable member in contact with one of the nests becomes disengaged from the conveyor, said means becoming inoperative upon commencement of the conveyor's forward movement.

7. An apparatus in accordance with claim 5 further including:
means for adjusting the location of the conveyor with reference to the work station to precisely position the spring groupings therein.

8. An apparatus for moving a succession of relay spring groupings with reference to first and second work stations comprising:
conveyor means having a plurality of nests mounted thereon to receive spring groupings;
drive means coupled to the conveyor means to move each succeeding spring grouping into the work stations;
means rendered effective upon each movement of the spring groupings into said work stations for incrementally advancing the spring groupings through the respective work stations;
means operable at the first and second work stations in synchronization with the movement of the spring groupings for working on said spring groupings;
means for adjusting the drive means to move the conveyor means in predetermined variable increments of advance comprising:
an index wheel coupled to the drive means, said index wheel having a plurality of notches spaced about its periphery;
a pivotally mounted member having a toothed portion engaging the notches in the wheel to halt the movement of the conveyor after a predetermined increment of advance; and
a cover plate mounted adjacent the index wheel for preventing the toothed portion from engaging predetermined notches.

9. An apparatus in accordance wtih claim 8 wherein: the first work station includes a contact welding apparatus, and
the second work station includes an apparatus for accurately shaping said contact welds.

10. A contact welding apparatus for relay springs on cards comprising:
a contact welding station including a pair of cooperating contact welding electrodes and actuable means for said electrodes,
a shaping station including an anvil, a reciprocable hammer, and actuable means for driving the hammer into cooperation with the anvil to shape at least one welded contact,
means for feeding individual relay springs on cards to the welding station in synchronization with the operation of the actuable means for the welding electrodes to bond contacts thereon and for simultaneously feeding at least one relay spring having a contact welded thereon to the shaping station in synchronization with the operation of the actuable means for driving the hammer to shape the welded contact; and
means responsive to said feeding means for thereafter incrementally advancing each of said relay spring cards through said welding station in accordance with the spacing of the individual springs on said card.

References Cited by the Examiner

UNITED STATES PATENTS

| | | | |
|---|---|---|---|
| 1,715,141 | 5/1929 | Mathieson | 198—135 X |
| 1,934,835 | 11/1933 | Weiss | 198—135 X |
| 2,637,798 | 5/1953 | Burge et al. | 219—79 |
| 2,892,920 | 6/1959 | Horlacher | 219—79 |
| 2,953,069 | 9/1960 | Smith | 29—38.3 X |
| 3,023,645 | 3/1962 | Craven et al. | 29—38.3 X |

RICHARD M. WOOD, *Primary Examiner.*

ANTHONY BARTIS, *Examiner.*

B. A. STEIN, *Assistant Examiner.*